(12) United States Patent
Dyba

(10) Patent No.: US 12,210,145 B2
(45) Date of Patent: Jan. 28, 2025

(54) SINGLE-PARTICLE LOCALIZATION MICROSCOPE

(71) Applicant: LEICA MICROSYSTEMS CMS GMBH, Wetzlar (DE)

(72) Inventor: Marcus Dyba, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 233 days.

(21) Appl. No.: 18/154,882

(22) Filed: Jan. 16, 2023

(65) Prior Publication Data
US 2023/0236401 A1 Jul. 27, 2023

(30) Foreign Application Priority Data
Jan. 21, 2022 (EP) .................................. 22152606

(51) Int. Cl.
*G02B 21/06* (2006.01)
*G01N 15/1429* (2024.01)
(Continued)

(52) U.S. Cl.
CPC ......... *G02B 21/06* (2013.01); *G01N 15/1429* (2013.01); *G01N 15/1434* (2013.01);
(Continued)

(58) Field of Classification Search
CPC .. G02B 21/06; G02B 21/008; G02B 21/0072; G02B 21/0056; G02B 21/0052;
(Continued)

(56) References Cited

U.S. PATENT DOCUMENTS

2009/0242798 A1* 10/2009 Bewersdorf ......... G02B 21/361
348/46
2013/0176574 A1 7/2013 Sirat
(Continued)

FOREIGN PATENT DOCUMENTS

WO WO 2012/049381 A2 4/2012
WO WO 2013/072273 A1 5/2013
(Continued)

OTHER PUBLICATIONS

Julien Caron et al., "Conical diffraction illumination opens the way for low phototoxicity super-resolution imaging," Cell Adhesion & Migration, vol. 8, No. 5, pp. 430-439, DOI: 10.4161/cam.29358, Sep. 3, 2014, XP055547124, Taylor & Francis Group, LLC, UK.
(Continued)

*Primary Examiner* — Don K Wong
(74) *Attorney, Agent, or Firm* — LEYDIG, VOIT & MAYER, LTD.

(57) ABSTRACT

A single-particle localization microscope, including an optical system configured to illuminate a sample region with a sequence of light patterns having spatially different distributions of illumination light adapted to cause a single particle located in the sample region to emit detection light, a detector configured to detect a sequence of intensities of the detection light emerging from the sample region in response to the sequence of illuminating light patterns, and a processor configured to determine, based on the sequence of intensities of the detection light, an arrangement of potential positions for locating the particle. The processor further illuminates the sample region with at least one subsequent light pattern, causes detection of at least one subsequent intensity, and decides, based on the at least one subsequent intensity of the detection light, which one of the
(Continued)

multiple potential positions represents an actual position of the particle in the sample region.

16 Claims, 5 Drawing Sheets

(51) Int. Cl.
  *G01N 15/1434* (2024.01)
  *G02B 21/16* (2006.01)
  *G02B 21/36* (2006.01)
  *G02F 1/01* (2006.01)

(52) U.S. Cl.
  CPC ............ *G02B 21/16* (2013.01); *G02B 21/365* (2013.01); *G02F 1/01* (2013.01)

(58) Field of Classification Search
  CPC ............ G02B 21/0032; G02B 21/0076; G01N 15/1456; G01N 15/147; G01N 2015/1488; G01N 2015/145; G01N 2015/1447; G01N 15/1434; G01N 23/221; G01N 23/22; G01N 23/2076; G01N 23/207; G01N 23/203; G01N 23/205; G01N 23/20091; G01N 23/20; G01N 23/223
  See application file for complete search history.

(56) References Cited

U.S. PATENT DOCUMENTS

| | | |
|---|---|---|
| 2016/0305884 A1 | 10/2016 | Hell |
| 2017/0322406 A1 | 11/2017 | Sirat |
| 2019/0011367 A1 | 1/2019 | Hell et al. |
| 2019/0234879 A1 | 8/2019 | Balzarotti et al. |

FOREIGN PATENT DOCUMENTS

| | | |
|---|---|---|
| WO | WO 2013/153294 A1 | 10/2013 |
| WO | WO 2015/097000 A1 | 7/2015 |
| WO | WO 2017/153430 A1 | 9/2017 |
| WO | WO 2018/069283 A1 | 4/2018 |
| WO | WO 2019/043458 A2 | 3/2019 |
| WO | WO 2021/111187 A2 | 6/2021 |

OTHER PUBLICATIONS

Clément Fallet et al., "Conical diffraction as a versatile building block to implement new imaging modalities for superresolution in fluorescence microscopy," Nanoimaging and Nanospectroscopy II (2014), Proc. of SPIE vol. 9169, pp. 916905, US, XP060039281, Aug. 28, 2014.

Francisco Balzarotti et al., "Nanometer resolution imaging and tracking of fluorescent molecules with minimal photon fluxes," Science, US, Dec. 22, 2016, pp. 1-85.

Fallet, Clément et al.: "A new method to achieve tens of nm axial super-localization based on conical diffraction PSF shaping", Progress in Biomedical Optics and Imaging, SPIE—International Society for Optical Engineering, Bellingham, WA, US, vol. 9331, Mar. 9, 2015 (Mar. 9, 2015), pp. 93310Q-93310Q, XP060049277.

Gwosch Klaus et al.: "Minflux nanoscopy delivers 3D multicolor nanometer resolution in cells", Nature Methods, vol. 17, No. 2, Feb. 1, 2020 (Feb. 1, 2020), pp. 217-224, XP055899632, UK.

* cited by examiner

SINGLE-PARTICLE LOCALIZATION MICROSCOPE

CROSS-REFERENCE TO PRIOR APPLICATION

This application claims benefit to European Patent Application No. EP 22152606.4, filed on Jan. 21, 2022, which is hereby incorporated by reference herein.

FIELD

The present invention relates to a single-particle localization microscope and a method for localizing a single particle in a sample region.

BACKGROUND

In the field of light microscopy, methods have become available that allow the localization of individual particles with a precision below the diffraction resolution limit. These methods can be used for single particle tracking of diffusion particles and super-resolution imaging.

For instance, a technology for super-resolution fluorescence imaging is based on conical diffraction that takes place when a polarized light beam is diffracted through a biaxial crystal. Methods which are based on this technology are known by acronyms such as CODIM (Conical Diffraction Microscopy), SRCD (Super-Resolution using Conical Diffraction) including PSIT (Projected Sequence of Intensities with various Topologies), and PDOS (Position Dependent Optical Semaphore). According to these methods, a single fluorescent light emitter can be localized by sequentially illuminating the emitter with a sequence of light patterns, measuring the intensity of light which is emitted during the illumination with each light pattern, and calculating an emitter position which fits to the set of measured light intensities.

Methods as explained above are disclosed in WO 2012/049381 A2, WO 2013153294 A1, and WO 2019/043458 A2. Further, reference is made to the publications of Julien Caron et al., Conical diffraction illumination opens the way for low phototoxicity super-resolution imaging, Cell Adhesion & Migration (2014), pages 430-439, DOI: 10.4161/cam.29358; Clement Fallet et al., Conical diffraction as a versatile building block to implement new imaging modalities for superresolution in fluorescence microscopy, Nanoimaging and Nanospectroscopy II (2014), Proc. of SPIE Vol. 9169, 916905; and Francisco Balzarotti et al., Nanometer resolution imaging and tracking of fluorescent molecules with minimal photon fluxes, Science (2016), DOI 10.1126/science.aak9913. Methods for tracking particles with minimal photon fluxes, as described in the latter publication, are often referred to as dark tracking. This category also includes an approach commonly known as MINFLUX and disclosed in WO 2013/072273 A1, WO 2018/069283 A1, WO 2015/097000 A1, and WO 2017/153430 A1.

The methods mentioned above suffer from an ambiguity uncertainty with respect to the localization of particle positions which has not yet been taken into account. Thus, when calculating an emitter position based on the sequence of light intensities measured in response to the sequence of illuminating light patterns, multiple potential emitter positions are determined that equally match the measured light intensities for symmetry reasons, and it is not clear which of these positions represents the actual emitter position.

So far, there is no efficient solution to this ambiguity problem. It could be considered to simply repeat the localization measurement sequence at one of the multiple potential positions to find out whether or not this position is the actual emitter position. However, such a solution would be slow due to the repetition of the complex measurement sequence. In particular, it would involve a slow movement of an optical scanning device such as a scanning mirror in order to redirect the illumination light towards a selected potential position. Such a mechanical movement of the scanning device takes a considerable amount of time, especially compared to the short time needed to change the illumination light pattern by using electro-optic or acousto-optical effects such as in conical diffraction. In addition, mechanical tolerances may affect the measurement accuracy. Furthermore, this simple solution would be particularly inefficient if, by way of falsification, a wrong potential position is selected for repeating the measurement sequence. Finally, it is not preferable in terms of photon budget since the particle must emit sufficient light for a complete sequence of measurements.

SUMMARY

In an embodiment, the present disclosure provides a single-particle localization microscope, comprising an optical system configured to illuminate a sample region with a sequence of light patterns having spatially different distributions of illumination light adapted to cause a single particle located in the sample region to emit detection light, a detector configured to detect a sequence of intensities of the detection light emerging from the sample region in response to the sequence of illuminating light patterns, and a processor configured to determine, based on the sequence of intensities of the detection light, an arrangement of potential positions for locating the particle in the sample region. The processor is further configured to: cause the optical system to illuminate the sample region with at least one subsequent light pattern having a spatial distribution of the illumination light which is asymmetrical with respect to the arrangement of the multiple potential positions, cause the detector to detect at least one subsequent intensity of the detection light emerging from the sample region in response to the at least one subsequent light pattern, and decide, based on the at least one subsequent intensity of the detection light, which one of the multiple potential positions represents an actual position of the particle in the sample region.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
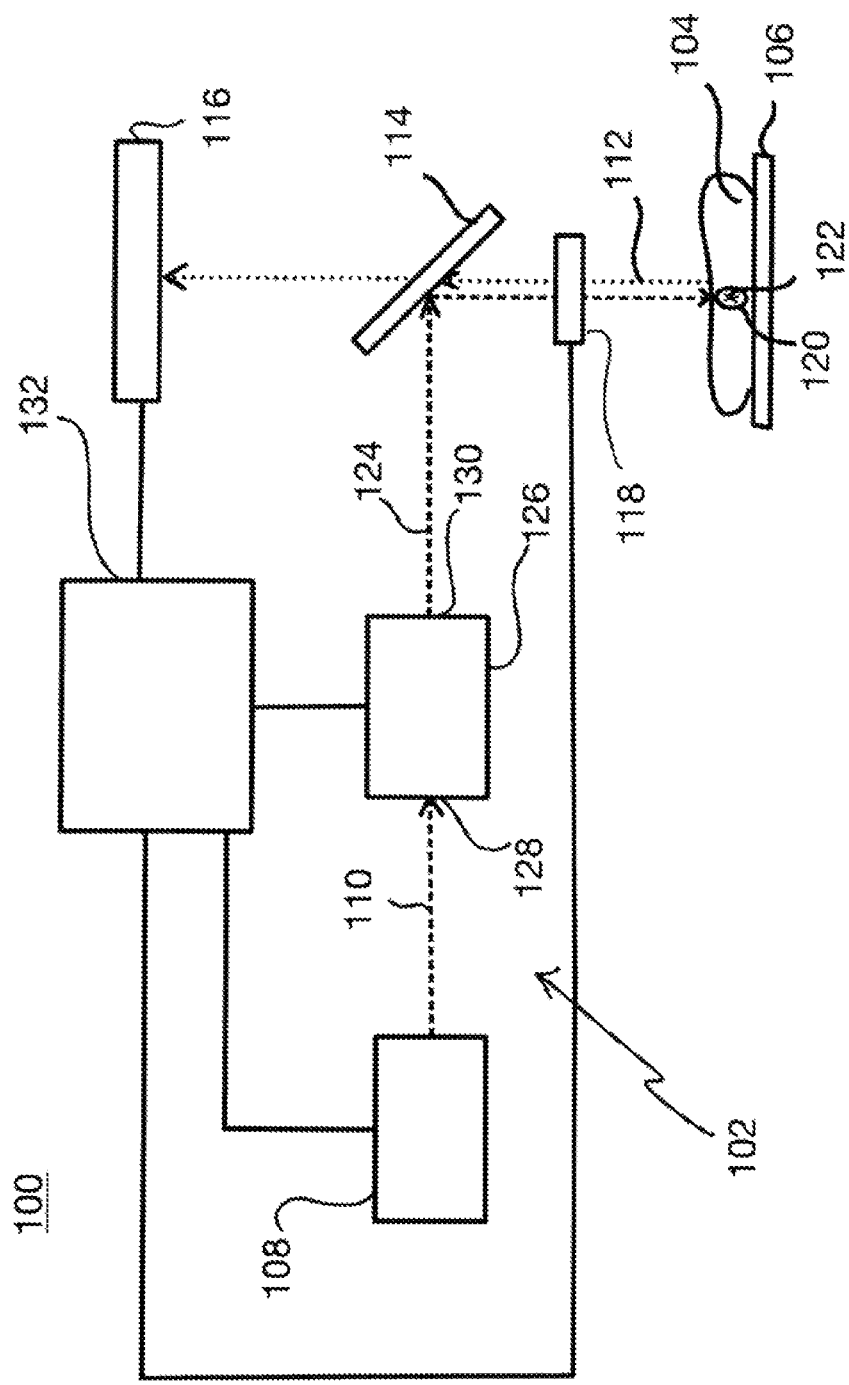
FIG. 1 illustrates a block diagram showing a single-particle localization microscope according to an embodiment.

In an embodiment, the present invention provides a microscope and a method that allow a single particle to be unambiguously, yet efficiently, localized in a sample region.

A single-particle localization microscope comprises an optical system configured to illuminate a sample region with a sequence of light patterns having spatially different distributions of the illumination light adapted to cause a single particle located in the sample region to emit detection light. The single-particle localization microscope comprises a detector configured to detect a sequence of intensities of the detection light emerging from the sample region in response to the sequence of illuminating light patterns. The single-particle localization microscope comprises a processor configured to determine, based on the sequence of intensities of the detection light, an arrangement of potential positions for locating the particle in the sample region. The processor is further configured to cause the optical system to illuminate the sample region with at least one subsequent light pattern having a spatial distribution of the illumination light which is asymmetrical with respect to the arrangement of the multiple potential positions. The processor is configured to cause the detector to detect at least one subsequent intensity of the detection light emerging from the sample region in response to the at least one subsequent light pattern. The processor is configured to decide, based on the at least one subsequent intensity of the detection light, which one of the multiple potential positions represents an actual position of the particle in the sample region.

The microscope is adapted to distinguish between multiple particle positions that are otherwise indistinguishable due to a symmetry of the illumination light patterns applied in a sequence of multiple intensity measurements based on which the particle is to be located. A symmetry of illumination light patterns occurs in a number of super-resolution localization approaches, such as—but not limited to—the conical diffraction-based methods mentioned above. Also, the aforementioned MINFLUX method may operate with light symmetrical patterns for localizing single particles. In all of these methods, a symmetry of light patterns sequentially illuminating the sample results in not just one, but several positions equally matching a sequence of detection light intensities that are measured in response to the sequence of symmetrical light patterns. A distinction between a plurality of potential particle positions can be achieved by illuminating the sample with at least one additional illumination light pattern which is used as a test pattern to resolve the localization ambiguity. For this purpose, the spatial distribution of the test pattern is selected such that the pattern has an asymmetrical shape with respect to an arrangement that results from the previously calculated particle positions.

In an embodiment, distinguishing between multiple particle positions can be realized with only one additional measurement. Furthermore, it does not require any mechanical repositioning of a scanning device such as a scan mirror that is typically used in laser scanning microscopy. As a result, fast and light efficient localization can be achieved.

For example, the optical system may comprise a mechanical scanning device such as the aforementioned scan mirror which is movable to scan the illumination light over the sample. This allows individual points in the sample to be scanned and imaged. Each point corresponds to a specific sample region that is coincident with a focal region of the optical system and includes a single emitter which is to be localized by means of the microscope. In such a configuration, the processor may cause the optical system to illuminate the specific sample region with the at least one subsequent light pattern forming the asymmetrical test pattern without using the scanning device for this purpose, so that no mechanical repositioning is required.

In particular, a non-preferred solution, which involves a physical and thus slow movement of the scanning device as well as a repetition of the multiple measurement sequence for a particular potential position, is especially inefficient if that particular position is not the true particle position, reflecting a situation of falsification. In contrast, embodiments of the present invention allow situations of verification and falsification to be clearly distinguished.

Different light patterns may result in similar ambiguities in terms of the potential particle positions which are to be distinguished. Embodiments of the present invention can be applied to all sorts of light patterns causing ambiguities due to their symmetry. Thus, the asymmetric test pattern can be adopted to the specific situation.

The additional intensity measurement using the test pattern can also be used for increasing precision of the localization process. In other words, the additional measurement is not limited to an ambiguity identification.

Furthermore, the additional intensity measurement based on the test pattern may be shortened in time and/or the illumination intensity of the test pattern may be reduced compared to measurements preceding the test measurement. The only condition to be fulfilled is that the detection signal provided by the test measurement is sufficiently high to allow a clear distinction between the correct and false particle positions.

Hereinafter, a single particle is understood in a broad sense covering, for example, simple molecules, proteins, in particular fluorescent molecules and proteins, etc. as well as more complex particles such as nano-particles, vesicle-lipid droplets, etc. without being limited thereto.

Preferably, the optical system comprises an electro-optical device or an acousto-optical device which is configured to generate both the sequence of light patterns and the at least one subsequent light pattern for illuminating the sample region. For example, a beam shaping unit may be used which is operated according to the principle of conical diffraction in order to shape the illumination light sequentially into light patterns with predetermined spatial distributions. This applies to both the symmetrical light patterns, on the basis of which the potential particle positions are calculated, and to the subsequently irradiated test pattern with its asymmetrical shape that only allows the true particle position to be distinguished from the false positions. Such an electro-optical or acousto-optical device can be operated fast compared to a scanning device which requires mechanical repositioning of a component such as a scan mirror. Therefore, in case that the optical system comprises a scanning device which is moved to scan the illumination light over the sample, it is preferably the electro-optical or acousto-optical device, rather than the mechanical scanning device, that generates all of the illumination light patterns, if possible, or at least the test pattern.

According to a preferred embodiment, the optical system is configured to form a light distribution from the illumination light in the sample region and to move the light distribution for generating the sequence of light patterns in the sample region. A fast electro-optical movement of the light distribution that does not require any mechanical adjustment can be achieved e.g. by conical diffraction as mentioned above.

For example, the optical system may be configured to sequentially shift the light distribution transversely to the light propagation direction in two different shift positions and/or to sequentially rotate the light distribution around a center axis parallel to the light propagation direction into different rotational positions for generating the sequence of light patterns in the sample region.

The light distribution may be vortex shaped or doughnut-shaped. Such a light distribution may be implemented, for example, in localization using the MINFLUX approach.

Preferably, the light distribution comprises at least two intensity maxima symmetrically opposed from a central symmetry axis extending between the intensity maxima and an intensity minimum along the central symmetry axis, said intensity preferably being zero. Such a configuration results in at least two potential particle positions that can be reliably distinguished between true and false when applying the asymmetrical illumination test pattern.

The processor may be configured to determine, based on the sequence of intensities of the detection light, a spatial probability distribution for multiple extrema representing the multiple potential positions for locating the particle in the sample region. Such a spatial probability distribution can be used in an efficient way to first find a set of potential particle positions, which are then classified as correct or incorrect by means of the asymmetrical test pattern.

Preferably, the processor may be configured to determine the spatial probability distribution as a function of the detected sequence of intensities from a pre-calculated table. This enables a particularly fast determination of the correct particle position.

The processor may be configured to determine, based on the spatial probability distribution, a line of symmetry, along which the multiple potential positions are located, and to define the spatial distribution of the subsequent light pattern to be asymmetrical with respect to the line of symmetry. Referring to such a symmetry line makes it easy and efficient to find a suitable asymmetrical light distribution for the test pattern.

According to a preferred embodiment, the processor is configured to estimate the subsequent intensity of the detection light based on the detected sequence of intensities before illuminating the sample region with the subsequent light pattern and to compare the estimated subsequent intensity to the detected subsequent intensity for deciding on the actual position of the particle in the sample region. For instance, an estimated intensity value may be calculated in advance for each of the potential particle positions. The estimated intensity values can then be easily compared to the detection light intensity which is measured in response to the illumination with the subsequent light pattern forming the test pattern.

Preferably, the detector is configured to count single photons for detecting both the sequence of intensities and the subsequent intensity of the detection light. Using a single photon counter enables the detection light intensities to be measured with high accuracy.

According to another aspect, a method is provided for localizing a single particle in a sample region, wherein the method comprises the following steps: illuminating the sample region with a sequence of light patterns having spatially different distributions of illumination light adapted to cause the particle located in the sample region to emit detection light; detecting a sequence of intensities of the detection light emerging from the sample region in response to the sequence of illuminating light patterns; and determining, based on the sequence of intensities of the detection light, an arrangement of potential positions for locating the particle in the sample region. The sample region is illuminated with at least one subsequent light pattern having a spatial distribution of the illumination light which is asymmetrical with respect to the arrangement of the multiple potential positions. At least one subsequent intensity of the detection light emerging from the sample region is detected in response to the at least one subsequent light pattern. A decision is made, based on the at least one subsequent intensity of the detection light, which one of the multiple potential positions represents an actual position of the particle in the sample region.

Preferably, the sample region is prepared to meet a single particle localization condition where only one particle is located in the sample region. The afore-mentioned condition specifies a singularization ensuring that the average distance between the particles included in the sample is larger than the diffraction-limited spatial resolution of the optical system.

The single particle localization condition may be met, for example, by selecting a particle concentration which is sufficiently low to achieve the intended singularization.

As an alternative, the single particle localization condition may be met by photo-activation or photo-deactivation of particles to keep the majority of the particles in a non-light-emitting state.

FIG. 1 is a block diagram showing a single-particle localization microscope 100 according to an embodiment. The microscope 100 may be implemented as a configuration which is based on laser-scanning confocal microscope (LSCM) without being limited thereto. FIG. 1 shows only those components of the microscope 100 which are helpful to understand the operating principle of embodiments of the invention presented herein. Needless to say that the microscope 100 may include additional components. For example, the microscope 100 may include optical lenses such as a tube lens and an objective lens used both for illumination and detection as well as pinholes which serve to reduce the amount of out-of-focus light in image formation in accordance with a confocal set-up.

The microscope 100 comprises an optical system 102 illuminating a sample 104
    which is arranged on a sample carrier 106. The optical system 102 includes a laser light source 108 which is configured to generate illumination light 110 in a wavelength range that is adapted to excite fluorophores included in the sample 104 to emit fluorescent radiation as detection light 112. The optical system 102 may comprise a dichroic beam splitter 114 which is configured to reflect the illumination light 110 onto the sample 104 and to transmit the detection light 112 towards a detector 116. The optical system 102 may further include a scanning device 118 such as a mirror arrangement which is movable to scan the illumination light 110 over the sample 104. This allows individual points in the sample 104 to be scanned and imaged. Each point corresponds to a specific sample region 120 that is coincident with a focal region of the optical system 102 and includes a single fluorescent emitter 122 which is to be localized by means of the microscope 100. Since the detection light 112 is returned to the scanning device 118 before being captured by the detector 116, the embodiment shown in FIG. 1 is a so-called descanned configuration.

The optical system 102 is configured to illuminate the sample region 120 with a sequence 124 of light patterns having spatially different light distributions. For this purpose, the optical system 102 may comprise an electro-optical device or an acousto-optic-optical device which is configured to perform sequential beam shaping of the illumination light 110 emitted from the light source 108. According to the specific embodiment shown in FIG. 1, the optical system 102 comprises a beam shaping unit 126 which is operated according to the principle of conical diffraction in order to shape the illumination light 110 sequentially into predetermined light patterns as described e.g. in the publication of Carot et al. mentioned above. Thus, the beam shaping unit 126 may include a biaxial crystal, a polarization state generator (PSG), and a polarization state analyzer (PSA). The PSG is made of a linear polarizer followed by a pair of Pockel cells arranged at an entry 128 and an exit 130 of the biaxial crystal, respectively. The PSA is laid out identically in reverse order. All Pockel cells are controlled electronically, allowing to control the polarization without moving mechanical parts in the beam shaping unit 126. This optical set-up is adapted to switch, in a very short time, from one light pattern to another light having a different light distribution. In particular, it should be noted that the switching time of the beam shaping unit 126 is orders of magnitude shorter than the time it would take, for example, the scanning device 118 to act on the illumination light 110 in a corresponding manner by its mechanical movement.

The microscope 100 further includes a processor 132 which may be used to control the microscope operation as a whole. According to the present embodiment, the processor 132 specifically controls the light source 108, the beam shaping unit 126, the scanning device 118, and the detector 116 in a way that allows the single emitter 122 to be unambiguously localized in the sample region 120 is described below.

Figure 2:
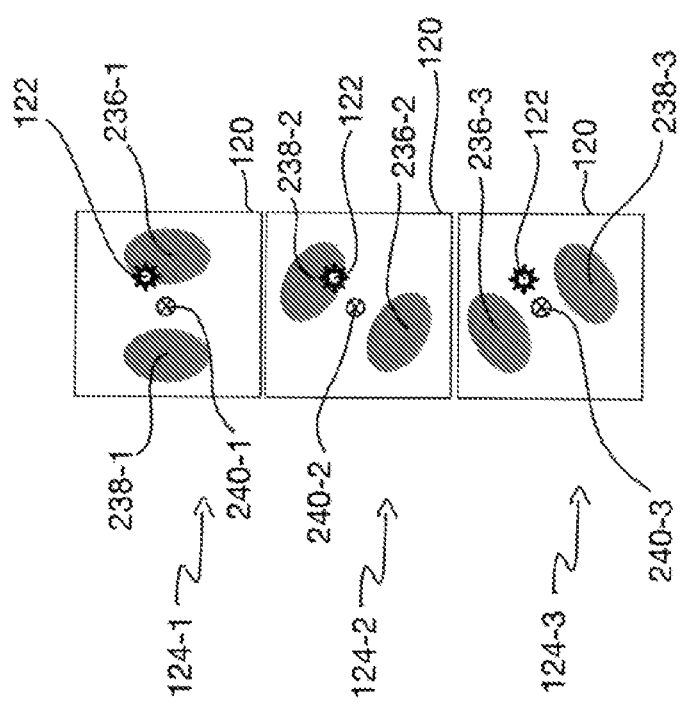
FIG. 2 illustrates a diagram of a sequence of three intensity measurements based on light patterns with different spatial distributions for locating a single fluorescent emitter according to an embodiment.

In particular, the processor 132 may cause the beam shaping unit 126 to illuminate the sample region 120 with a sequence of light patterns having different topologies as illustrated in FIG. 2. According to the present embodiment, a first light pattern 124-1, a second light pattern 124-2, and a third light pattern 124-3 are sequentially created as shown from top to bottom in FIG. 2. When the sample region 120 is sequentially illuminated with the light patterns 124-1, 124-2, and 124-3, the detector 116 captures the detection light 112 emerging from the sample region 120 in a corresponding sequence of light intensities I1, I2, and I3. For this purpose, the detector 116 may be configured to count single photons when detecting the sequence of intensities I1, I2, I3. Thus, one sequence of three intensity measurements for detecting the intensities I1, I2, I3 results in a triple of integers (m1, m2, m3) representing the respective photon counts.

In the example of FIG. 2, each of the three light patterns 124-1, 124-2, and 124-3 is created as a light distribution that is formed from a double peak. More specifically, each light pattern 124-1, 124-2, 124-3 comprises a first intensity maximum (peak) 236-1, 236-2, 236-3 and a second intensity maximum (peak) 238-1, 238-2, 238-3, the first and second intensity maxima being symmetrically opposed from an intensity minimum 240-1, 240-2, 240-3 that forms a symmetry center of the respective light pattern 124-1, 124-2, 124-3. The intensity minimum 240-1, 240-2, 240-3 is preferably zero. As can be seen in FIG. 2, the symmetry centers of the three light patterns 124-1, 124-2, and 124-3 given by the intensity minima 240-1, 240-2, 240-3 coincide with each other. In other words, the symmetry center remains unchanged when the light patterns 124-1, 124-2, and 124-3 are switched from one pattern to another in the sequence of three intensity measurements.

It is to be noted that FIG. 2 is a plan view showing each light pattern 124-1, 124-2, 124-3 in a cross-section perpendicular to a direction along which the illumination light 110 propagates. Accordingly, the intensity minimum 240-1, 240-2, 240-3 of the respective light pattern 124-1, 124-2, 124-3 defines an axis of symmetry extending along the light propagation direction. It should further be noted that FIG. 2 is a simplified illustration of the spatial variation of the light intensity of each light pattern 124-1, 124-2, 124-3. Thus, although FIG. 2 illustrates each light pattern 124-1, 124-2, 124-3 with its two intensity maxima 236-1/238-1, 236-2/238-2, 236-3/238-3 being sharply separated from the intensity minimum therebetween, each intensity peak is actually characterized by a continuous decrease of the intensity from its maximum to the minimum at the respective symmetry center 240-1, 240-2, 240-3.

Overall, the process of creating the sequence of light patterns 124-1, 124-2, 124-3 by means of the beam shaping unit 126 can be considered as a process of providing a structured light distribution and moving this light distribution in the sample region 120 without changing its shape as such. According to the embodiment shown in FIG. 2, a structured light distribution formed by two peaks and an intensity minimum therebetween is rotated as a whole about the symmetry center by an angle of 120°, the symmetry center being coincident with the intensity minimum. However, such a configuration is to be understood only as an example. For instance, a structured light distribution such as a vortex or donut shaped distribution may be shifted as a whole in its position in order to generate the sequence of different light patterns in the sample region 120. Furthermore, other types of structured illumination light distributions and/or different or more complex sequences may be used for generating the sequence of light patterns.

In order to enable a single fluorescent emitter to be localized based on a light pattern sequence as illustrated in FIG. 2, a singularization condition must be met. Thus, when performing a super-resolution localization process, it is to be ensured that only one particle is present in the sample region 120 of the optical system 102, which is coincident with the focal region of the optical system 102. The singularization condition can be met by applying various methods for suitably preparing the sample 104. For example, the sample 104 may be prepared by selecting a proper concentration of fluorescent emitters included in the sample 104. Alternatively, depending on the nature of the particles involved, photo-activation or photo-deactivation may be applied to keep a majority of the particles in a non-light emitting state. In any case, the concentration of fluorescent emitters should be sufficiently low in order to achieve a sparse emitter distribution in the sample 104 ensuring that the average distance between the emitters is larger than the diffraction-limited spatial resolution of the optical system 102. If such an emitter singularization is achieved, it is possible to localize the single emitter 122 within the sample region 120 with spatial precision that is much higher than the spatial dimensions of the light patterns 124-1, 124-2, 124-3, which are determined by the diffraction-limited spatial resolution of the optical system 102.

In the following, it is assumed that the fluorescent emitter 122 is singulated in the sample region 120 as explained above. Then, an attempt can be made to localize the fluorescent emitter 122 in the sample region 120 based on the sequence of intensities I1, I2, I3 detected in response to the sequence of light patterns 124-1, 124-2, 124-3 illuminating the sample region 120. This can be done due to the exact knowledge of the spatial distributions of the light patterns 124-1, 124-2, 124-3 which are controlled by the beam shaping unit 126. Provided that the intensities I1, I2, I3 would be measured without any noise and the light patterns 124-1, 124-2, 124-3 would be known without any tolerances, one might conclude that the position of the fluorescent emitter 122 can be calculated with infinite precision. In other words, one might believe that the localization precision is only limited by noise ΔI1, ΔI2, and ΔI3 that occurs when measuring the intensities I1, I2, and I3, respectively, and by imperfections in the light patterns 124-1, 124-2, 124-3. However, as explained below with reference to FIGS. 3 to 6, an ambiguity occurs with respect to an emitter position that can be calculated based on the measured intensities I1, I2, I3 and the a priori knowledge of the light patterns 124-1, 124-2, 124-3.

Figure 4:
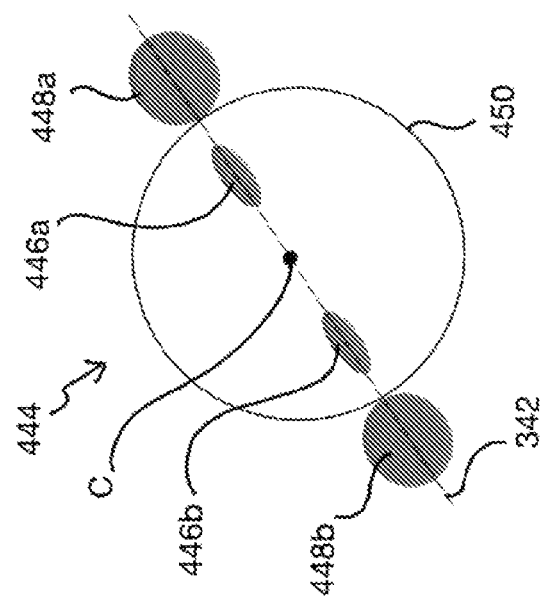
FIG. 4 illustrates a diagram of a spatial probability distribution that indicates multiple potential emitter positions arranged along a line of symmetry.
Figure 3:
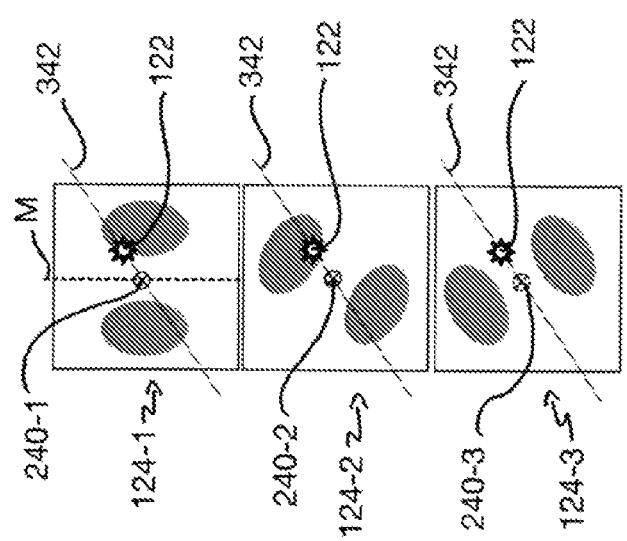
FIG. 3 illustrates a diagram of a symmetry of the three light patterns shown in FIG. 2.

Thus, as illustrated in FIGS. 3 and 4, an ambiguity occurs in that multiple potential positions of the fluorescent emitter 122 equally match the detected intensity triple (I1, I2, I3) due to a symmetry of the spatial light distributions of the light patterns 124-1, 124-2, 124-3. According to the present example, each light pattern 124-1, 124-2, 124-3 exhibits a mirror symmetry with respect to an axis M extending between the two peaks, i.e. the intensity maxima 236-1/238-1, 236-2/238-2, 236-3/238-3 of the light pattern (see FIG. 2). For simplicity of illustration, the mirror axis M is shown in the upper part of FIG. 3 only for the first light pattern 124-1. The mirror symmetry of the respective light pattern 124-1, 124-2, 124-3 results in a symmetry line 342 defined by two points as shown in FIG. 3. A first of these points is given by the symmetry center of the light pattern 124-1, 124-2, 124-3, i.e. the intensity minimum 240-1, 240-2, 240-3 between the two peaks of the light pattern. A second point is given by the true position of the fluorescent emitter 122.

FIG. 4 shows a map representing a spatial probability distribution 444 which is calculated by the processor 132 based on the intensities I1±ΔI1, I2±ΔI2, I3±ΔI3 taking into account the measurement errors ΔI1, ΔI2, ΔI3 and the spatial distributions of the light pattern 124-1, 124-2, 124-3 which are known in advance. The spatial probability distribution 444 includes multiple areas depicting potential emitter positions that fit to the triple measurement (I1±ΔI1, I2±ΔI2, I3±ΔI3). As can be seen in FIG. 4, there are two potential emitter positions 446a, 446b that are arranged on the symmetry line 342 symmetrically opposed from the aforementioned symmetry center (first point) thereof, designated by C in FIG. 4. Thus, the potential emitter positions 446a, 446b are mirror-symmetrical with respect to the center C of the symmetry line 342. The mirror symmetry of the potential emitter positions 446a, 446b reflects the mirror symmetry of the light patterns 124-1, 124-2, 124-3. In the example of FIG. 4, it is assumed that the two potential emitter positions 446a, 446b are located within an Airy disk 450.

As can be seen further in FIG. 4, there are two additional emitter positions 448a, 448b that are arranged outside the Airy disk 450 on the symmetry line 342 symmetrically opposed from the aforementioned symmetry center thereof. Also the potential emitter positions 448a, 448b are mirror-symmetrical with respect to the center C of the symmetry line 342, and the mirror symmetry of the potential emitter line positions 448, 448b reflects the mirror symmetry of the light patterns 124-1, 124-2, 124-3, likewise.

Thus, according to the example shown in FIG. 4, two pairs of potential emitter positions 446a/446b and 448a/448b are calculated, wherein the emitter positions of each pair equally match the measured intensity triple (I1±ΔI1, I2±ΔI2, I3±ΔI3). Depending on the specific circumstances of the experiment, it may be possible to decide which one of the two position pairs 446a/446b and 448a/448b includes the actual position of the emitter 122. For example, suppression of detection light by means of a pinhole in the detection path could be used to exclude pair 448a/448b as correct positions in the example of FIG. 4. However, as will become evident in the following, a distinction between the positions pairs 446a/446b and 448a/448b is not even necessary.

In any case, it is not possible to decide, based on the spatial probability distribution 444 alone, which of the potential positions 446a, 446b, 448a, 448b represents the actual emitter position. Accordingly, due to the symmetry of the light patterns 124-1, 124-2, and 124-3, the measured intensity triple (I1±ΔI1, I2±ΔI2, I3±ΔI3) is not sufficient to unambiguously locate the emitter 122 in the sample region 120.

To solve the problem explained above, embodiments of the present invention illuminate the sample region 104 with at least one subsequent light pattern which is used as a test pattern to perform a final measurement for resolving the ambiguity in terms multiple potential emitter positions. More specifically, the test pattern is created with a predetermined spatial distribution which is asymmetrical with respect to the arrangement of the potential positions 446a, 446b, 448a, 448b previously calculated on the basis of the intensity triple (I1±ΔI1, I2±ΔI2, I3±ΔI3). In response to the test pattern, a subsequent detection light intensity is detected which can be used to decide which one of the multiple potential positions 446a, 446b, 448a, 448b is the correct emitter position.

Figure 5:
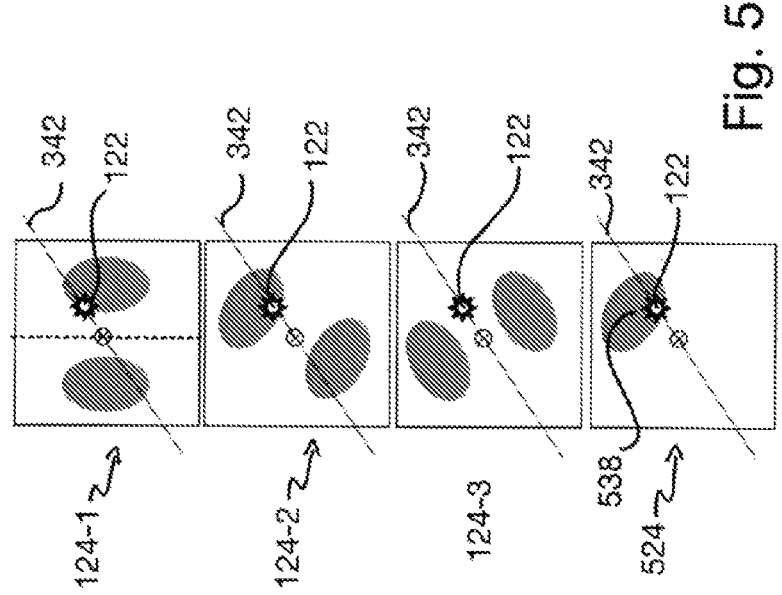
FIG. 5 illustrates a diagram of a fourth intensity measurement based on a light pattern that has an asymmetrical spatial distribution with respect to the multiple potential emitter positions according to an embodiment.

According to the present embodiment, the shape and/or the orientation of the subsequent light pattern may be determined according to the estimated probability distribution 444 shown in FIG. 4. Preferably, an asymmetrical light pattern is used which makes a maximal difference in detection light intensity between the correct emitter position and a false position. The bottom part of FIG. 5 illustrates a suitable asymmetrical light pattern 524 following up on the example shown in FIGS. 2 to 4. As can be seen in FIG. 5, the subsequent light pattern 524 has a spatial light distribution which differs significantly from the previous light patterns 124-1, 124-2, 124-3. For instance, the light pattern 524 has only one intensity maximum (peak) 538, and this maximum is laterally displaced from the symmetry line 342 along which all of the potential emitter positions 446a, 446b, 448a, 448b are located. Thus, it is ensured that the spatial distribution of the light pattern 524 is asymmetrical with respect to the overall arrangement of the previously calculated emitter positions 446a, 446b, 448a, 448b. In this respect, it is to be noted that also FIG. 5 is a simplified illustration in terms of the spatial intensity variation of the light pattern 524. As with the light patterns 124-1, 124-2, 124-3, the intensity of the light pattern 524 is actually characterized by a continuous decrease of the intensity from its maximum to the minimum which is preferably zero.

In the example of FIG. 5, the subsequent light pattern 524 is located with its intensity maximum close to the fluorescent emitter 122, i.e. close to position 466a which turns out to be the correct emitter position. Accordingly, a subsequent (fourth) intensity I4±ΔI4, which is measured by means of the detector 116, is relatively high. Based on the subsequent intensity I4±ΔI4, the processor 132 is enabled to decide that emitter position 446a is correct, while the other positions such as 446b, 448a, and 448b are false.

Figure 6:
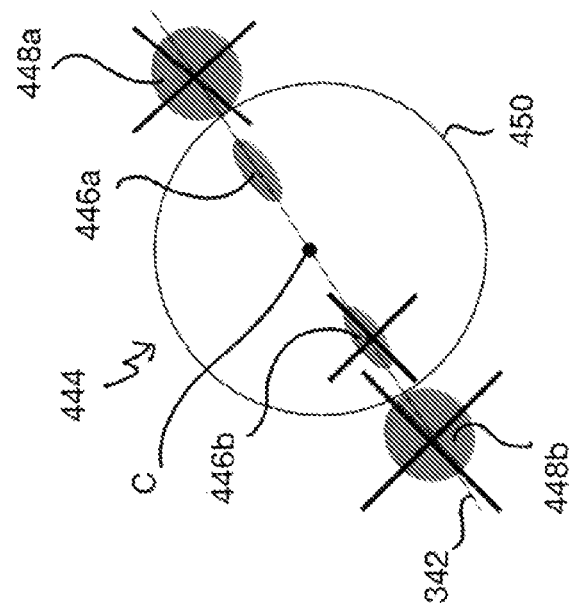
FIG. 6 illustrates a diagram of a decision on the correct emitter position based on the fourth measurement.

In order to make a proper decision, the processor 132 may be configured to estimate the intensity of the subsequent light intensity I4±ΔI4, which will be detected in response to the illumination of the sample region 120 with the subsequent light pattern 524, on the basis of the previously measured intensity triple (I1±ΔI1, I2±ΔI2, I3±ΔI3) before illuminating the sample region 120 with the light pattern 524. For example, in the present embodiment, the processor 132 may calculate estimated intensity values which are expected to be detected in case that the fluorescent emitter 122 is located either in the potential position 446a or in any of the other potential positions 446b, 448a, 448b. By comparing these estimated intensity values to the intensity I4±ΔI4 actually measured in response to the light pattern 524, the processor 132 can then decide which of the potential positions is the correct emitter position. In the example shown in FIGS. 2 to 6, the intensity value estimated for position 446a is significantly higher than the estimated intensity values for the other positions 446b, 448a, 448b. The intensity I4±ΔI4 which is then actually measured corresponds to the relatively high estimated intensity value so that position 446a is recognized as the correct emitter position. In other words, the other potential emitter positions 446b, 448a, 448b can be reliably rejected as false positions, as illustrated in FIG. 6 by cross symbols.

Figure 7:
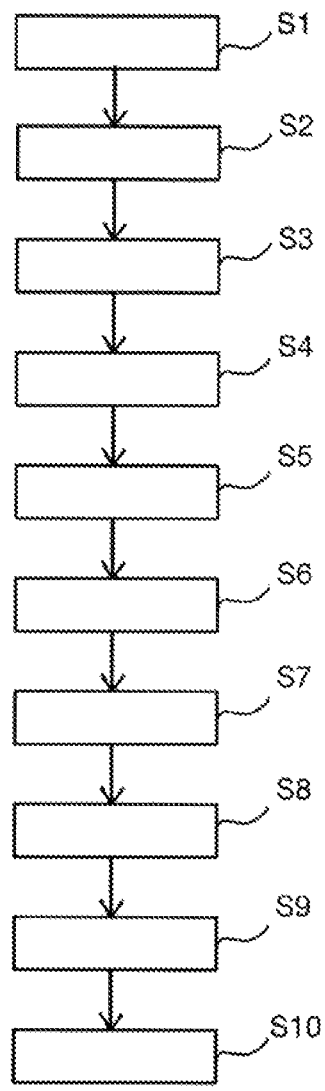
FIG. 7 illustrates a flow diagram showing a method for localizing the single fluorescent emitter according to an embodiment.

FIG. 7 is a flow diagram illustrating a method for localizing the fluorescent emitter 122 by means of the microscope 100 according to an embodiment.

The method starts in step S1 in which the sample 104 is prepared to satisfy a singularization condition as explained above. Thus, the sample 104 is prepared in a way ensuring that only one particle is located in the sample region 120 to be examined.

In step S2, the processor 132 controls the light source 108 and the scanning device 118 to direct the illumination light 110 onto a specific point of the sample 104. This point is coincident with the focal region of the optical system 102 and forms the sample region 120 including the singulated emitter 122 that is to be localized.

In steps S3 to S5, the processor 132 controls the beam shaping unit 126 to generate the sequence of light patterns 124-1, 124-2, 124-3 with spatially different light distributions as shown by way of an example in FIGS. 2 and 3.

More specifically, in step S3, a first measurement is performed by illuminating the sample region 120 with the first double-peak light pattern 124-1. In response thereto, the detector 116 configured as a single photon counter detects a first number m1 of photons emitted from the fluorescent emitter 122 which is illuminated with the light pattern 124-1. According to FIG. 2, the fluorescent emitter 122 is located in a peripheral portion of the peak formed by the intensity maximum 236-1 of the light pattern 124-1, and an exemplary number of 13 photons is assumed to be counted as intensity I1 (i.e. m1=I1=13).

Subsequently, in step S4, a second measurement is performed by illuminating the sample region 120 with the second double-peak light patterns 124-2. In response thereto, the detector 116 detects a second number m2 of photons emitted from the fluorescent emitter 122 which is illuminated with the second light pattern 124-2. According to FIGS. 2 and 3, it is assumed the fluorescent emitter 122 is located a little closer to one of the symmetrical intensity maxima formed by the second light pattern 124-1 compared to the first measurement so that a larger number of photons such as 19 is assumed to be counted as intensity I2 (i.e. m2=I2=19).

Subsequently, in step S5, a third measurement is performed by illuminating the sample region 120 with the third double-peak light patterns 124-3. In response thereto, the detector 116 detects a third number m3 of photons emitted from the fluorescent emitter 122 which is illuminated with the third light pattern 124-3. According to FIGS. 2 and 3, it is assumed the fluorescent emitter 122 is located far from the maxima of the two the peaks formed by the second light pattern 124-3 compared to the first and second measurements. Thus, a small number of photons such as 1 is assumed to be counted (i.e. m3=I3=1).

In step S6, the processor 132 may determine the spatial probability distribution 444 from the triple intensity (m1, m2, m3) which is equal to (13, 19, 1) in the present example. The spatial probability distribution 444 indicates multiple extrema representing the potential emitter positions 446a, 446b, 448a, 448b as shown FIG. 4. When calculating the spatial probability distribution 444, the processor 132 takes into account the specific spatial distributions of the light patterns 124-1, 124-2, 124-4 which are known in advance. For example, the spatial probability distribution 444 can be determined on the basis of a pre-calculated table.

In step S7, the processor 132 may determine, based on the spatial probability distribution 444, the symmetry line 342 along which all potential emitter positions 446a, 446b, 448a, 448b are located, as shown in FIG. 4. Then, the processor 132 may define a suitable illumination light distribution which is asymmetrical with respect to the arrangement of the potential emitter positions 446a, 446b, 448a, 448b located along the symmetry line 342.

In step S8, the processor 132 may estimate a detection light intensity to be expected in response to illuminating the sample region 120 with a subsequent fourth light pattern, the asymmetrical light distribution thereof having been determined in step S7. Specifically, the processor 132 may calculate multiple estimated intensity values in form of photon numbers associated with the multiple potential positions determined in step S6.

In step S9, the processor 132 causes the beam shaping unit 126 to form the asymmetrical light distribution from the illumination light 110 that has been determined in step S7 in order to perform a fourth intensity measurement. The sample region 120 is illuminated with the light pattern 524 as shown in the lower part of FIG. 5. In response thereto, the detector 116 detects a fourth number m4 of photons emitted from the fluorescent emitter 122 which is illuminated with the light pattern 524.

In step S10, the processor 132 compares the photon number m4 to the estimated photon numbers calculated in step S8. In the present example, it is assumed that photon number m4 is close the photon number which has been previously estimated for the emitter position 446a. In contrast, m4 is significantly different from the photon numbers estimated for the other potential positions 446b, 448a, 448b.

As a result, the processor determines the fluorescent emitter 122 to be located in position 446a.

It is to be noted that a subsequent intensity measurement as described above for resolving an ambiguity with respect to potential emitter positions can be performed very fast. Thus, a test pattern such as the light pattern 524 shown in FIG. 5 can be created by the beam shaping unit 126 which may be implemented by an electro-optical device or an acousto-optical device without being limited thereto. Such devices do not require any physical movement of mechanical parts, unlike other types of beam influencing components such as the scanning device 118 shown in FIG. 1. Furthermore, since the light distribution of the test pattern is asymmetrical with respect to the arrangement of potential emitter positions, it may be sufficient to perform only one additional test measurement to resolve the ambiguity, rather than to repeating the complete sequence of measurements for one of the potential emitter positions.

The ambiguity checking herein is not limited to the embodiments described above. For example, the light patterns 124-1, 124-2, 124-3 as well as the subsequent light pattern 524 as shown in FIG. 5 are generated by applying conical diffraction. Furthermore, the light patterns are created in form of structured light distributions comprising two intensity peaks symmetrically opposed from an intensity minimum located in the center of the pattern. However, other types of light distributions may be implemented such as vortex or doughnut shaped patterns which are shifted in position as implemented e.g. in MINFLUX.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 single-particle localization microscope
102 optical system
104 sample
106 sample carrier
108 light source
110 illumination light
112 detection light
114 dichroic beam splitter
116 detector
118 scanning device
120 sample region
122 fluorescent emitter
124 sequence of light patterns
124-1 light pattern
124-2 light pattern
124-3 light pattern
126 beam shaping unit
128 entry of biaxial crystal
130 exit of biaxial crystal
132 processor
236-1 intensity maximum of light pattern
236-2 intensity maximum of light pattern
236-3 intensity maximum of light pattern
238-1 intensity maximum of light pattern
238-2 intensity maximum of light pattern
238-3 intensity maximum of light pattern
240-1 intensity minimum of light pattern
240-2 intensity minimum of light pattern
240-3 intensity minimum of light pattern
342 symmetry line
444 spatial probability distribution
446a potential position
446b potential position
448a potential position
448b potential position
450 Airy disk
524 subsequent light pattern

The invention claimed is:

1. A single-particle localization microscope, comprising:
an optical system configured to illuminate a sample region with a sequence of light patterns having spatially different distributions of illumination light adapted to cause a single particle located in the sample region to emit detection light,
a detector configured to detect a sequence of intensities of the detection light emerging from the sample region in response to the sequence of illuminating light patterns, and
a processor configured to determine, based on the sequence of intensities of the detection light, an arrangement of potential positions for locating the particle in the sample region,
wherein the processor is further configured to:
cause the optical system to illuminate the sample region with at least one subsequent light pattern having a spatial distribution of the illumination light which is asymmetrical with respect to the arrangement of the multiple potential positions, cause the detector to detect at least one subsequent intensity of the detection light emerging from the sample region in response to the at least one subsequent light pattern, and decide, based on the at least one subsequent intensity of the detection light, which one of the multiple potential positions represents an actual position of the particle in the sample region.

2. The single-particle localization microscope according to claim 1, wherein the optical system comprises an electro-optical device or an acousto-optical device which is configured to generate both the sequence of light patterns and the at least one subsequent light pattern for illuminating the sample region.

3. The single-particle localization microscope according to claim 1, wherein the optical system is configured to form a light distribution from the illumination light in the sample region and to move the light distribution for generating the sequence of light patterns in the sample region.

4. The single-particle localization microscope according to claim 3, wherein the optical system is configured to sequentially shift the light distribution transversely to a light propagation direction into different shift positions and/or to sequentially rotate the light distribution around a center axis parallel to the light propagation direction into different rotational positions for generating the sequence of light patterns in the sample region.

5. The single-particle localization microscope according to claim 3, wherein the light distribution is vortex shaped or donut shaped.

6. The single-particle localization microscope according to claim 3, wherein the light distribution comprises at least two intensity maxima symmetrically opposed from a central symmetry axis extending between the intensity maxima and an intensity minimum along the central symmetry axis.

7. The single-particle localization microscope according to claim 1, wherein the processor is configured to determine, based on the sequence of intensities of the detection light, a spatial probability distribution with multiple extrema representing the multiple potential positions for locating the particle in the sample region.

8. The single-particle localization microscope according to claim 7, wherein the processor is configured to determine the spatial probability distribution as a function of the detected sequence of intensities from a pre-calculated table.

9. The single-particle localization microscope according to claim 7, wherein the processor is configured to determine, based on the spatial probability distribution, a line of symmetry comprising at least two of the multiple potential positions and to define the spatial distribution of the subsequent light pattern to be asymmetrical with respect to the line of symmetry.

10. The single-particle localization microscope according to claim 1, wherein the processor is configured to estimate the subsequent intensity of the detection light based on the detected sequence of intensities before illuminating the sample region with the subsequent light pattern and to compare the estimated subsequent intensity to the detected subsequent intensity for deciding on the actual position of the particle in the sample region.

11. The single-particle localization microscope according to claim 1, wherein the detector is configured to count single photons for detecting both the sequence of intensities and the subsequent intensity of the detection light.

12. The single-particle localization microscope according to claim 6, wherein the intensity minimum is zero.

13. A method for localizing a single particle in a sample region, comprising:

illuminating the sample region with a sequence of light patterns having spatially different distributions of illumination light adapted to cause the particle located in the sample region to emit detection light, detecting a sequence of intensities of the detection light emerging from the sample region in response to the sequence of illuminating light patterns, and determining, based on the sequence of intensities of the detection light, an arrangement of potential positions for locating the particle in the sample region, wherein the sample region is illuminated with at least one subsequent light pattern having a spatial distribution of the illumination light which is asymmetrical with respect to the arrangement of the multiple potential positions, wherein at least one subsequent intensity of the detection light emerging from the sample region is detected in response to the at least one subsequent light pattern, and a decision is made, based on the at least one subsequent intensity of the detection light, which one of the multiple potential positions represents an actual position of the particle in the sample region.

14. The method according to claim 13, wherein the sample region is prepared to meet a single particle localization condition where only one particle is located in the sample region.

15. The method according to claim 14, wherein the single particle localization condition is met by selecting a suitable particle concentration.

16. The method according to claim 14, wherein the single particle localization condition is met by photo-activation or photo-deactivation of particles to keep a majority of the particles in a non-light emitting state.

* * * * *